United States Patent Office 3,816,481
Patented June 11, 1974

3,816,481
PROCESS FOR PREPARING 6-METHYLATED STEROIDS
George H. Douglas, Paoli, Pa., Warren R. Faust, Ann Arbor, Mich., and Herchel Smith, Bryn Mawr, Pa., assignors to American Home Products Corporation, New York, N.Y.
No Drawing. Filed Feb. 11, 1972, Ser. No. 225,676
Int. Cl. C07c 169/20, 169/08
U.S. Cl. 260—397.4  2 Claims

ABSTRACT OF THE DISCLOSURE

A novel process for the synthesis of 6α-methylated steroids, particularly of the 17α-pregnane type. The final products have progestational activity.

BACKGROUND OF THE INVENTION

This invention relates to a process for making compositions of matter classified in the art of chemistry as 6α-methyl-13-lower alkyl-17α-lower alkyl, lower alkenyl and lower alkynylgonanes.

SUMMARY OF THE INVENTION

The invention sought to be patented as a principal process aspect is described as residing in the concept of a sequence of reactions comprising:

(a) enolacetylating a 13-lower alkyl-17β-hydroxygon-4-en-3 - one to produce a 13-lower alkyl-3,17β-dihydroxygona-3,5(6)-diene, diacetate;
(b) selectively reducing the double bond in the 3 position of said 13-lower alkyl-3,17β-dihydroxygona-3,5(5)-diene, diacetate;
(c) reacetylating said reduced product to produce a 13-lower alkyl-3,17β-dihydroxygon-5(6)-ene, diacetate;
(d) epoxidizing the 5(6) double bond of said 13-lower alkyl-3,17β-dihydroxygon-5(6)-ene, diacetate to form the corresponding 5(6)-oxide;
(e) treating said 5(6) oxide with a metallo methyl compound to produce a 13-lower alkyl-6-methyl-3,5 17β-gonatriol;
(f) oxidizing said triol to produce a 13-lower alkyl-5-hydroxy-6-methyl-gona-3,17-dione;
(g) dehydrating said 13-lower alkyl-5-hydroxy-6-methyl-gona-3,17-dione to produce a 13-lower alkyl-6-methyl-gon-4-en-3,17-dione;
(h) enol etherifying said 13-lower alkyl-6-methylgon-4-en-3,17-dione to produce a 13-lower alkyl-3-alkoxy-6-methylgona-3,5(6)-dien-17-one;
(i) treating said 13-lower alkyl-3-alkoxy-6-methylgona-3,5(6)dien-17-one with an appropriate organo metallic to produce a 13-lower alkyl-17-hydroxy-17α-lower alkyl, lower alkenyl or lower alkynyl-3-alkoxy-6-methylgona-3,5(6)-diene;
(j) hydrolyzing the enol ether of said 13-lower alkyl-17-hydroxy-17α-lower alkyl, lower alkenyl, or lower alkynyl - 3 - alkoxy-6-methylgona-3,5(6)-diene and recovering the 6-α-methylated-Δ-4-3-one product.

The tangible embodiments produced by the principal process aspect of the invention possess the inherent general physical properties of being white crystalline solids, are substantially insoluble in water and are generally soluble in polar sovents, such as dimethylacetamide. Examination of the compounds produced by the aforesaid process reveals, upon infrared, ultraviolet, and nuclear magnetic resonance spectrographic analysis, spectral data supporting the molecular structure hereinbefore set forth. The aforementioned physical characteristics taken together with the nature of the starting materials, and the elemental analysis further confirm the molecular structure hereinbefore set forth.

The tangible embodiments produced by the principal process aspect of the invention possess the inherent applied use characteristic of exerting progestational activity in animals as evidenced by pharmacological evalution according to standard test procedures.

The progestational activity can be demonstrated by following the test procedure described by Elton and Edgren in "Endocrinology" vol. 63, pp. 464–472 (1958), a generally accepted test procedure for progestational agents. In this test, immature female rabbits are primed with estradiol-17β for six days. The primed rabbits then receive test compound daily for five days before autopsy on the sixth. Progestational activity is accessed by histological evaluation of uterine glandular proliferation. When tested by this method the compounds produced by the invention exhibit progestational activity, for example, when administered subcutaneously, 13-ethyl-17α-ethynyl-17-hydroxy-6α-methylgon-4-en-3-one exhibits eight to nine times the activity of progesterone.

The invention sought to be patented in a subgeneric process aspect is described as residing in the concept of a sequence of reactions including:

(a) enol acetylating 13-ethyl-17β-hydroxygon-4-en-3-one to produce 13-ethyl-3,17α-dihydroxygona-3,5(6)-diene, diacetate;
(b) selectively reducing the double bond in the 3 position of said 13-ethyl-3,17β-dihydroxygona-3,5(6)-diene, diacetate;
(c) reacetylating said reduced product to produce 3-ethyl-3,17β-dihydroxygon-5(6)-ene, diacetate;
(d) epoxidizing the 5(6) double bond of said 3-ethyl-3,17β-dihydroxygon-5(6)-ene, diacetate to produce 13-ethyl-3,17β-dihydroxygonane-5(6)-oxide, diacetate;
(e) treating said 5(6) oxide with a metallomethyl compound to produce 13-ethyl-6-methyl-3,5,17β-gonatriol;
(f) oxidizing said triol to produce 13-ethyl-5-hydroxy-6-methylgona-3,17-dione;
(g) dehydrating said 13-ethyl - 5 - hydroxy-6-methylgona-3,17-dione to produce 13-ethyl-6-methyl-gon-4-en-3,17-dione;
(h) enol etherifying said 13-ethyl-6-methyl-gon-4-en-3,17-dione to produce 13-ethyl - 3 - ethoxy-6-methylgona-3,5(6) diene-17-one;
(i) reacting said 13-ethyl-3-ethoxy-6-methylgona-3,5(6)-diene-17-one with an ethynylating agent to produce 13-ethyl-3-ethoxy-17α-ethynyl - 17 - hydroxy-6-methylgona-3,5(6)-diene;
(j) hydrolyzing said 13-ethyl - 3 - ethoxy-17α-ethynyl-17-hydroxy-6-methylgona-3,5(6)-diene and recovering 13-ethyl-17α-ethynyl-17-hydroxy-6α-methylgon-4-en-3-one.

As used herein the term "lower alkyl" refers to a straight chain saturated hydrocarbon radical, having from 1 to 6 carbon atoms, among which are for the purpose of illustration, but without limiting the generality of the foregoing, methyl, ethyl, and propyl. The term "lower alkenyl" means a monounsaturated hydrocarbon radical, having from 2 to 5 carbon atoms, among which are for the purposes of illustration but without limiting the generality of the foregoing, vinyl, and allyl. The term "lower alkynyl" means a hydrocarbon radical, containing a triple bond, having 2 to 5 carbon atoms, among which are for the purpose of illustration, but without limiting the generality of the foregoing, ethynyl and propynyl.

DESCRIPTION OF THE PREFERRED EMBODIMENT

The manner of practicing the invention will now be generally described with reference to a specific embodiment, namely 13-ethyl-17α-ethynyl-17-hydroxy-6α-methylgon-4-en-3-one, so as to enable one skilled in the art to practice the same as follows:

In the first step a 13-ethyl-3,17β-dihydroxygon-4-en-3-one is enol acetylated to give 13-ethyl-3,17β-dihydroxygona-3,5(6)-diene, diacetate. However, a skilled organic chemist will recognize that any of the enol acetylation methods well-known in the art may be used. The reduction of the double bond in the 3-position of the enol acetate is accomplished by treatment with sodium borohydride. Reacetylation of the reduced product by standard technique gives 13-ethyl - 3,17β - dihydroxygon-5(6)-ene, diacetate which is crystallized and then epoxidized; conveniently with m-chloroperbenzoic acid, although other methods well-known in the art of organic chemistry will be equally satisfactory. The 13-ethyl-3,17β-dihydroxy-gonane-5(6)-oxide, diacetate so produced is isolated by standard means and is then treated with an organic-metallic methyllating agent, conveniently methyl Grignard reagent, to produce 13-ethyl-6-methyl-3,5,17β-gonatriol.

Oxidation of the triol to produce 13-ethyl-5-hydroxy-6-methylgona-3,17-dione is conveniently accomplished by treatment with chromic acid in acetone, but it will be obvious to an organic chemist that many other oxidation methods will be suitable for this purpose. Dehydration of the 5-hydroxyl group, conveniently by treatment with concentrated aqueous hydrochloric acid in acetic acid gives 13-ethyl-6-methylgon-4-en-3,17-dione. This is converted by treatment with ethyl orthoformate, in the presence of a catalytic amount of strong acid, a standard enol etherification method, to 13-ethyl-3-ethoxy-6-methylgona-3,5(6)-diene-17-one. Ethynylation at the 17 position to give 13 - ethyl-3-ethoxy-17α-ethynyl-6-methylgona-3,5(6)-dien-17-ol is accomplished by standard methods, conveniently with lithium acetylide as the ethylene diamine complex in dimethyl-sulphoxide solution under an atmosphere of acetylene. Hydrolysis of the enol ether and separation of the 6α and 6β isomers to obtain the desired 13-ethyl-17α-ethynyl - 17 - hydroxy-6α-methyl-gon-4-en-3-one may be accomplished by standard procedures, of which hydrolysis using concentrated aqueous hydrochloric acid in methanolic solution followed by column chromatography is particularly convenient.

While the process has been specifically described with reference to preparation of a specific embodiment bearing a 13-ethyl substituent and a 17α-ethynyl substituent it will be readily apparent to one skilled in the art that a gonane derivative bearing any lower alkyl substituent in the 13 position may be utilized in an identical manner to produce the 13-lower alkyl substituted gonanes which are contemplated to be prepared by the invention and that other organo metallic reagents may be substituted for the lithium acetylide-acetylene reagent to produce the various 17α-lower alkyl, lower alkenyl and lower alkynyl derivatives contemplated to be prepared by the invention. The process as applied to such variations is the full equivalent of the described process within the scope of the invention.

The following examples illustrate the best mode contemplated by the inventors of carrying out the process of the invention.

EXAMPLE 1

13-ethyl-3,17β-dihydroxygona-3,5(6)-diene diacetate 13-ethyl-17β-hydroxygon-4-en-3-one (10 g.) is added to a mixture of acetic anhydride (48 ml.) and ethyl acetate (total volume of solution is 500 ml.) containing 0.1 ml. of 70% perchloric acid.

The mixture is stirred for twenty minutes, then shaken repeatedly with sodium bicarbonate solution until all reaction ceases.

Evaporation of the ethyl acetate gives a pale yellow crystalline solid. Trituration of a small quantity with methanol gives the title compound, M.P. 154–156°.

EXAMPLE 2

13-ethyl-3,17β-dihydroxygon-5(6)-ene, diacetate

13 - ethyl - 3,17β - dihydroxygona - 3,5(6) - diene, diacetate (total crude from Example 1) is suspended in ethanol (200 ml.), methanol (200 ml.) and water (50 ml.). Sodium borohydride (10 g.) is added, and after 2 hours a further 10 g. of borohydride is added.

The mixture is stirred overnight, then refluxed for 1 hour.

Acetic acid (100 ml.) is added and the solvent concentrated *in vacuo*. Water is added and the mixture extracted with ether.

Evaporation of the ether extract gives a glassy material which is dissolved in 20 ml. pyridine and 20 ml. acetic anhydride and heated to 100° for 2 hours.

Excess anhydride is destroyed with methanol, and the mixture worked up by adding water and extracting with benzene. The benzene extract is evaporated and the solid residue recrystallized from methanol to give the title compound (7.7 g.), M.P. 141–144°.

EXAMPLE 3

13-ethyl-3,17β-dihydroxygonane-5(6)-oxide, diacetate 13-ethyl - 3,17β - dihydroxygon-5(6)-ene, diacetate (10. g.) is dissolved in benzene (250 ml.) and treated with m-chloroperbenzoic acid (6 g. of material assaying as 8% peracid) at room temperature for 18 hours.

The benzene solution is washed with sodium bicarbonate solution and evaporated to dryness. The solid residue is triturated with methanol to give the title compound (8.3 g.), M.P. 164–167°.

EXAMPLE 4

13-ethyl-6-methyl-3,5,17β-gonatriol 13-ethyl-3,17β-dihydroxygonane-5(6) - oxide, diacetate (9.75 g.) is dissolved in ether (975 ml.) and treated with 3 M methyl magnesium bromide in ether (150 ml.). The resultant mixture is refluxed for one hour then allowed to stand overnight. Excess Grignard reagent is destroyed with water, and the gelatinous precipitate dissolved with dilute sulfuric acid.

The organic layer is separated, washed, dried, evaporated and triturated with ether to give a white solid (6.25 g.) a portion of which is recrystallized from methanol to give a product with M.P. 218–224°.

EXAMPLE 5

Preparation of 13-ethyl-5-hydroxy-6-methylgona-3,17-dione 13-ethyl-6-methyl-3,5,17β-gonatriol (3.1 g.) is dissolved in acetone (500 ml.) and treated with 8 N chromic acid (5.4 ml.) for 5 minutes with stirring. Isopropanol is added (2 ml.), followed by water and the mixture extracted with ether, washed and dried. Evaporation of the solvent and trituration with ether gives the diketone (2.58 g.), M.P. 213–216°.

EXAMPLE 6

Preparation of 13-ethyl-6-methylgon-4-en-3,17-dione 13-ethyl-5-hydroxy-6-methylgona-3,17-dione (2.0 g.) is dissolved in acetic acid (35 ml.) and concentrated HCl (2.2 ml.) is added and the mixture let stand for 5 minutes. Benzene is added, and the organic layer separated and washed with water and bicarbonate. Evaporation of the solvent and crystallization from ether gives the title compound (1.2 g.), M.P. 140–150°. UV $\lambda_{max}$ 239 mμ (ε 16,050).

EXAMPLE 7

13-ethyl-3-ethoxy-6-methylgona-3,5(6)-dien-17-one 13-ethyl-6-methylgon-4-en-3,17-dione (9.0 g.) is added to a mixture of dioxane (90 ml.), ethyl orthoformate (9 ml.) and p-toluenesulfonic acid (0.50 g.) and stirred for 2½ hours.

Ether is added, and the solution washed with bicarbonate. Evaporation of the solvent and crystallization from methanol gives the title compound (7.0 g.), M.P. 144–150°.

EXAMPLE 8

13-ethyl-3-ethoxy-17α-ethynyl-6-methyl-gona-3,5(6)-dien-17-ol 13-ethyl-3-ethoxy-6-methylgona-3,5-(6)-dien - 17 - one (1 g.) is added to a mixture of dimethylsulfoxide (15 ml.) and lithium acetylide-ethylene diamine complex (1 g.) in an atmosphere of acetylene. After 1 hour, the mixture is poured into water and extracted with ether.

The organic layer is washed, dried and evaporated to give the title compound as a viscous oil, 1 gram.

EXAMPLE 9

13-ethyl-17α-ethynyl-6α-methyl-gon-4-en-3-one

Crude 13-ethyl-3-ethoxy-17-α-ethynyl-6-methyl-gona-3,5-(6)-dien-17-ol (7 g.) is dissolved in a mixture of methanol (250 ml.), concentrated HCl (16.8 ml.) and water (11.2 ml.) and stirred for 30 minutes. The mixture is diluted with water and the product extracted into ether. The ether extract is washed with bicarbonate and brine, then dried (sodium sulfate). Evaporation gives a partially crystalline mass which is chromatographed on Grade III neutral alumina to give the title compound (1.98 g.).

The subject matter which the applicants regard as their invention is particularly claimed as follows:

1. A process for the preparation of a 13-lower alkyl-17 hydroxy-17α-ethynyl-6α-methyl-gon-4-en - 3 - one which comprises:
   (a) treating a 13-lower alkyl-17β-hydroxygon-4-en-3-one with acetic anhydride in the presence of an acid catalyst to produce a 15-lower alkyl-3,17β-dihydroxygon-3,5(6)-diene, diacetate;
   (b) treating the product of step (a) with sodium borohydride to produce a 13-lower alkyl-3,17β-dihydroxygon-5(6)-ene;
   (c) treating the product of step (b) with acetic acid, and then with acetic anhydride to produce a 13-lower alkyl-3,17β-dihydroxygon-5(6)-ene, diacetate:
   (d) treating the product of step (c) with m-chloroperbenzoic acid to produce a 13-lower alkyl-3,17β-dihydroxygonan-5(6)-oxide, diacetate;
   (e) treating the product of step (d) with a methyl Grignard reagent to produce a 13-lower alkyl-6-methyl-3,5,17β-gonatriol;
   (f) treating the product of step (e) with chromic acid to produce a 13-lower alkyl-5-hydroxy-6-methyl-gona-3,17-dione;
   (g) treating the product of step (f) with concentrated aqueous hydrochloric acid in glacial acetic acid to produce a 13-lower alkyl-6-methyl-gon-4 - en - 3,17-dione;
   (h) treating the product of step (g) with ethyl orthoformate to produce a 13-lower alkyl-3-ethoxy-6-methylgona-3,5(6)-dien-17-one;
   (i) treating the product of step (h) with lithium acetylide ethylene diamine complex in the presence of excess acetylene to produce a 13-lower alkyl-3-ethoxy-17α-ethynyl-6-methyl-gona-3,5(6)-dien-17-ol;
   (j) treating the product of step (i) with a mixture of hydrogen chloride, methanol and water to produce a product containing a 13-lower alkyl-17α-ethynyl-17-hydroxy-6α-methyl-gon-4-en-3-one and;
   (k) chromatographing the product of step (i) on Grade III neutral alumina to separate and recover a 13-lower alkyl-17α-ethynyl-17-hydroxy - 6α - methyl-gon-4-en-3-one.

2. The process of claim 1 wherein the 13-lower alkyl group is ethyl.

References Cited

UNITED STATES PATENTS 3,716,638    2/1973    Annes et al. _____ 424—243

ELBERT L. ROBERTS, Primary Examiner

U.S. Cl. X.R.

260—397.5, 239.55, 397.3